US012611082B2

(12) United States Patent
Hyun et al.

(10) Patent No.: US 12,611,082 B2
(45) Date of Patent: Apr. 28, 2026

(54) ELECTROSTATIC CLEANING DEVICE

(71) Applicant: LG HOUSEHOLD & HEALTH CARE LTD., Seoul (KR)

(72) Inventors: Chang Hwan Hyun, Seoul (KR); Eun Mi Kim, Seoul (KR); Yoon Ji Choi, Seoul (KR); Jung Yong Lee, Seoul (KR)

(73) Assignee: LG HOUSEHOLD & HEALTH CARE LTD., Seoul (KR)

( * ) Notice: Subject to any disclaimer, the term of this patent is extended or adjusted under 35 U.S.C. 154(b) by 640 days.

(21) Appl. No.: 17/894,255

(22) Filed: Aug. 24, 2022

(65) Prior Publication Data

US 2023/0132625 A1 May 4, 2023

(30) Foreign Application Priority Data

Nov. 3, 2021 (KR) ......................... 10-2021-0149903
Apr. 18, 2022 (KR) ......................... 10-2022-0047636

(51) Int. Cl.
*A47L 13/40* (2006.01)
*A46B 5/00* (2006.01)
(Continued)

(52) U.S. Cl.
CPC ............ *A47L 13/40* (2013.01); *A46B 5/0095* (2013.01); *A46B 15/002* (2013.01); *A47L 13/08* (2013.01);
(Continued)

(58) Field of Classification Search
CPC .......... A47L 13/40; A47L 13/42; A47L 13/16; A47L 13/256; A47L 13/38; A47L 13/24–258; A46B 15/002; B08B 6/00
(Continued)

(56) References Cited

U.S. PATENT DOCUMENTS 6,216,306 B1 * 4/2001 Esterson .................. A46B 7/04
D4/118
2004/0163667 A1 8/2004 Learman
(Continued)

FOREIGN PATENT DOCUMENTS

CN 102439430 A * 5/2012 ............. G01N 27/22
CN 105212855 B 10/2017
(Continued)

OTHER PUBLICATIONS

English translation of KR20130055242A (Year: 2011).*
(Continued)

*Primary Examiner* — David S Posigian
*Assistant Examiner* — Sukwoo James Chang
(74) *Attorney, Agent, or Firm* — Birch, Stewart, Kolasch & Birch, LLP

(57) ABSTRACT

An electrostatic cleaning device includes: a static electricity generator configured to generate static electricity; a handle part connected to one side of the static electricity generator; and a cleaning tool adapted to be assembled to and disassembled from the static electricity generator. The static electricity generator includes a first electrified body part configured as a donut-shaped case and configured to deliver a negative charge to the cleaning tool; a belt rotatably installed in an inner space of the first electrified body part and configured to transfer the negative charge; and a second electrified body part configured to supply the negative charge to the belt.

13 Claims, 13 Drawing Sheets

(51) Int. Cl.

| | |
|---|---|
| *A46B 15/00* | (2006.01) |
| *A47L 13/08* | (2006.01) |
| *A47L 13/12* | (2006.01) |
| *A47L 13/16* | (2006.01) |
| *A47L 13/256* | (2006.01) |
| *A47L 13/38* | (2006.01) |
| *A47L 13/42* | (2006.01) |
| *H02N 1/08* | (2006.01) |

(52) U.S. Cl.
CPC ............... *A47L 13/12* (2013.01); *A47L 13/16* (2013.01); *A47L 13/256* (2013.01); *A47L 13/38* (2013.01); *A47L 13/42* (2013.01); *H02N 1/08* (2013.01); *A46B 2200/3026* (2013.01); *A46B 2200/3033* (2013.01)

(58) Field of Classification Search
USPC ......................................................... 15/1.52
See application file for complete search history.

(56) References Cited

U.S. PATENT DOCUMENTS

| | | | |
|---|---|---|---|
| 2015/0171559 A1* | 6/2015 | Pavageau ........... | H01R 13/6485 |
| | | | 439/89 |
| 2020/0376248 A1* | 12/2020 | Chen ....................... | H02M 3/00 |

FOREIGN PATENT DOCUMENTS

| | | | | | |
|---|---|---|---|---|---|
| CN | 109480710 | A | * | 3/2019 | .......... A47L 11/4013 |
| CN | 112716353 | A | * | 4/2021 | ............. A47L 13/46 |
| JP | 5-51458 | U | | 7/1993 | |
| JP | 2585089 | B2 | | 2/1997 | |
| KR | 20130055242 | A | * | 11/2011 | .......... A47L 9/0477 |
| KR | 10-2017-0046051 | A | | 4/2017 | |
| KR | 10-1767058 | B1 | | 8/2017 | |
| KR | 20-2021-0000025 | U | | 1/2021 | |
| KR | 20210000025 | U | * | 1/2021 | ............. A47L 13/40 |
| KR | 10-2365400 | B1 | | 2/2022 | |

OTHER PUBLICATIONS

English translation of KR 20210000025U (Year: 2021).*
English translation of CN 109480710A (Year: 2019).*
English translation of CN 112716353A (Year: 2021).*
English translation of CN 102439430A (Year: 2012).*
English translation of KR20170046051A (Year: 2017).*
Korean Notice of Allowance for Korean Application No. 10-2021-0149903, dated Oct. 30, 2025.
Machine translation of KR-20-2021-0000025-U, published on Jan. 6, 2021.

* cited by examiner

ELECTROSTATIC CLEANING DEVICE

CROSS-REFERENCE TO RELATED APPLICATION

The present application claims priority under 35 U.S.C. § 119(a) to Korean patent application number 10-2021-0149903, filed on Nov. 3, 2021 and Korean patent application number 10-2022-0047636, filed on Apr. 18, 2022, in the Korean Intellectual Property Office, the entire disclosure of which is incorporated herein by reference.

BACKGROUND

1. Technical Field

The present disclosure generally relates to an electrostatic cleaning device, and more particularly, to an electrostatic cleaning device capable of increasing the cleaning area as well as increasing the length of a belt that delivers an electrostatic charge (negative charge) to an electrified body, by configuring a static electricity generator in a donut-shape, and improving a user's convenience, by configuring the donut-shaped static electricity generator for the user to be able to assemble cleaning tools for various purposes, increasing electrostatic force in proportion to an increased surface area of the electrified body part even if the length of an electrostatic induction belt for delivering the electrostatic charge (negative charge) to the electrified body part is relatively short, by configuring the surface area of the electrified body part that collects the electrostatic charge (negative charge) in the static electricity generator to be as wide as possible in a limited space, and reducing power consumption as well as reducing noise, by configuring to supply power in a pulse cycle.

2. Related Art

In general, a cleaner includes various cleaners such as a vacuum cleaner that collects foreign substances such as dust by using a suction power generated by driving a motor with electricity, a non-motorized cleaner that attaches a rotary brush to a roller and rotates the rotary brush to sweep the dust, an electrostatic cleaner that inductively charges the charging plate of the positive electrode and the charging plate of the negative electrode to generate static electricity and then collects foreign substances, and a cleaner using static electricity which use static electricity generated by the plastic paper attached to the belt rubbing against the static electricity generator when the front and rear rollers rotate to clean.

Among these, vacuum cleaners have the advantage of good dust suction and fast cleaning speed, but generate a lot of noise during operation, and small foreign substances such as fine dust are spread again in the air, which is not suitable for simple cleaning.

Accordingly, a cleaner using static electricity is being actively researched and developed as a cleaner which generates less noise, is simple to prepare, and can clean even fine dust.

In other words, as a cleaner that uses static electricity, from a cleaner that uses static electricity generated by rubbing a cleaning cloth with a floor to a cleaner that uses static electricity generated by continuous friction of the plastic paper attached to the belt with the static electricity generating member when the front and rear rollers rotate is being researched and developed.

In such an electrostatic cleaner, since the static electricity generation force determines a cleaning ability, research on an electrostatic cleaner capable of maximizing the static electricity generation force has recently been conducted.

SUMMARY

The present disclosure has been made in an effort to solve the issues of the related art as described above. Embodiments provide an electrostatic cleaning device capable of maximizing static electricity generation force in a limited space by increasing the length of a belt that delivers an electrostatic charge (negative charge) to an electrified body, by configuring the static electricity generator that generates static electricity using the principle of the van der Graf generator in a donut-shape.

In addition, embodiments provide an electrostatic cleaning device capable of improving user convenience by configuring cleaning tools for various purposes to be assembled in a donut-shaped static electricity generator.

In addition, embodiments provide an electrostatic cleaning device capable of increasing the electrostatic force in proportion to the increased surface area of the electrified body part even if the length of the electrostatic induction belt for delivering the electrostatic charge (negative charge) to the electrified body part is relatively short, by configuring the surface area of the electrified body part that collects electrostatic charge (negative charge) in the static electricity generator that generates static electricity using the principle of the van der Graf generator to be as wide as possible in a limited space, and reducing power consumption as well as reducing noise, by configuring to supply power in a pulse cycle.

In accordance with an aspect of the present disclosure, there is provided an electrostatic cleaning device including: a static electricity generator configured to generate static electricity; a handle part connected to one side of the static electricity generator; and a cleaning tool adapted to be assembled to and disassembled from the static electricity generator, wherein the static electricity generator includes a first electrified body part configured as a donut-shaped case and configured to deliver a negative charge to the cleaning tool; a belt rotatably installed in an inner space of the first electrified body part and configured to transfer the negative charge; and a second electrified body part configured to supply the negative charge to the belt.

Specifically, the static electricity generator may further include first conductor parts respectively installed on outer surfaces of both sides of the first electrified body part and configured to deliver the negative charge transferred through the belt to the first electrified body part; and a second conductor part configured to deliver the negative charge of the second electrified body part to the belt.

Specifically, the belt may be rotated by a roller part installed in the inner space of the donut-shaped first electrified body part. The roller part may include one drive roller and a plurality of moving rollers, the drive roller may be connected to a motor and rotated by a driving force of the motor to transmit its rotational force to the belt, and each of the plurality of moving rollers may be installed on a bent portion caused by the first electrified body part forming the donut shape and rotates to guide the belt.

Specifically, each of the first conductor parts may include an outer plate exposed to the outer surface of each of the both sides of the first electrified body part; a fixed plate integrally formed with the outer plate and fixed to the first electrified body part; and a protrusion piece connected to the fixed plate and protruding so as to be adjacent to the belt.

Specifically, the static electricity generator may further include attachment parts respectively installed on inner surfaces of both sides of the first electrified body part and configured to attach the cleaning tool, and each of the attachment part may include a fixed plate fixed to the first electrified body part; and a velcro adhered to the fixed plate and exposed to the inner surface of each of the both sides of the first electrified body part, and configured to attach the cleaning tool.

Specifically, the cleaning tool may be fixed by being attached at both ends to the velcro after wrapping the first electrified body part.

Specifically, the cleaning tool may be a floor push stick head, and the floor push stick head may include a base in the form of a flat plate to which a cleaning cloth is attached, the base being in contact with a lower surface of the first electrified body part to transfer a negative charge charged to the first electrified body part to the cleaning cloth; a pair of first coupling parts provided on an upper portion of the base at an interval corresponding to a width of the first electrified body part, the pair of first coupling parts being in close contact with the outer surfaces of the both sides of the first electrified body part; a second coupling part provided as a protruding structure on the upper portion of the base and in close contact with inner surfaces of both sides of the first electrified body part in a state of being inserted into a hole formed by the first electrified body part being provided in the donut-shape; and auxiliary attachment parts provided on upper edges of both sides of the base and attaching both ends of the cleaning cloth to fix the cleaning cloth to the base.

Specifically, each of the first coupling part may be formed of a conductor, and be in contact and connected with the first conductor part exposed to the outer surface of each of the both sides of the first electrified body part to deliver the negative charge transferred through the belt to the base.

Specifically, the cleaning tool may be a brush head, and the brush head may include a base in the form of a flat plate to which a dust brush is attached, the base being in contact with a lower surface of the first electrified body part to transfer the negative charge charged to the first electrified body part to the dust brush; a pair of first coupling parts provided on an upper portion of the base at an interval corresponding to a width of the first electrified body part, the pair of first coupling parts being in close contact with the outer surfaces of the both sides of the first electrified body part; and a second coupling part provided as a protruding structure on the upper portion of the base and in close contact with inner surfaces of both sides of the first electrified body part in a state of being inserted into a hole formed by the first electrified body part being provided in the donut-shape.

Specifically, each of the first coupling part may be formed of a conductor, and be in contact and connected with the first conductor part exposed to the outer surface of each of the both sides of the first electrified body part to deliver the negative charge transferred through the belt to the base.

In accordance with another aspect of the present disclosure, there is provided an electrostatic cleaning device including: a static electricity generator connected to a cover part provided with a handle to generate static electricity and deliver it to a cleaning tool; and a button part configured to operate the static electricity generator. The static electricity generator includes a first electrified body part forming a main body sealed by the cover part and configured to deliver a negative charge to the cleaning tool; an electrostatic induction belt rotatably installed in an inner space of the first electrified body part to transfer the negative charge; and a second electrified body part configured to supply the negative charge to the electrostatic induction belt, and the first electrified body part includes an auxiliary electrified body including a plurality of rib assemblies in the inner space so as to increase a total surface area to increase a maximum saturation point of electrostatic force.

Specifically, the first electrified body part may include an edge electrified body forming an edge of the main body and configured to collect a negative charge to remove foreign substances floating from a floor; and a bottom electrified body forming a bottom of the main body, connected to the auxiliary electrified body, and configured to collect a negative charge to remove foreign substances from the floor.

Specifically, the bottom electrified body may have a double structure in which an inner surface is formed of a un-electrified body material and an outer surface is formed of an electrified body material.

Specifically, the auxiliary electrified body may be installed on the inner surface of the bottom electrified body, and installed so as to be connected to the electrified body material forming the outer surface of the bottom electrified body.

Specifically, the auxiliary electrified body may be assembled or integrally formed so as to be connected to the electrified body material forming the outer surface of the bottom electrified body.

Specifically, the static electricity generator may further include a first conductor part configured to deliver the negative charge transferred through the electrostatic induction belt to the first electrified body part; and a second conductor part configured to deliver the negative charge of the second electrified body part to the electrostatic induction belt.

Specifically, the first conductor part may include a collecting plate having one side installed adjacent to the electrostatic induction belt and forming a peak shape of a lightning rod structure or a sawtooth shape to collect the negative charge from the electrostatic induction belt; and a delivering plate having one side connected to the other side of the collecting plate and the other side being installed to be adjacent to the edge electrified body of the first electrified body part, extending long in a longitudinal direction of the edge electrified body to deliver the negative charge to the first electrified body part, and forming a peak shape of a lightning rod structure or a sawtooth shape.

Specifically, the static electricity generator may further include a coupling part provided in the form of a groove on a front portion of the first electrified body part in a longitudinal direction intersecting a cleaning direction, and the coupling part may be provided to detachably attach a scraper configured to remove foreign substances from a cleaning target (cloth, bedding, carpet) requiring physical scraping.

Specifically, the button part may include a power button, and when the power button is pressed while power is off, the power may be turned on and electric power may be supplied in a pulse cycle.

Specifically, when the power button is pressed while the power is off, the electrostatic cleaning device may repeat maintaining an on state for an initial first time to operate a motor configured to rotate the electrostatic induction belt, then maintaining an off state for a second time to stop the operation of the motor, and maintaining the on state for a third time to operate the motor.

Specifically, the button part may include a ground button used to remove foreign substances from the electrostatic cleaning device, and when the ground button is pressed, polarity (negative charge) generated while the electrostatic induction belt is rotated by the motor may be momentarily dissipated and electrostatic force may be lowered so as to remove foreign substances.

Specifically, the first electrified body part may be formed using conductive plastic as an electrified body material.

An electrostatic cleaning device according to example embodiments is capable of maximizing static electricity generation force in a limited space by increasing the length of a belt that delivers an electrostatic charge (negative charge) to an electrified body, by configuring a static electricity generator that generates static electricity using the principle of the van der Graf generator in a donut-shape.

In addition, the electrostatic cleaning device according to example embodiments is configured such that cleaning tools for various purposes may be assembled in the donut-shaped static electricity generator, thereby improving a user's convenience by increasing the user's cleaning options.

In addition, in the electrostatic cleaning device according to example embodiments, the static electricity generator has the donut-shape and a small amount of vortex is generated by a hole formed in the center when dust is removed from the air, thereby increasing a cleaning ability.

In addition, the electrostatic cleaning device according to example embodiments is capable of increasing the electrostatic force in proportion to the increased surface area of the electrified body part even if the length of an electrostatic induction belt for delivering the electrostatic charge (negative charge) to the electrified body part is relatively short, by configuring the surface area of the electrified body part that collects the electrostatic charge (negative charge) in the static electricity generator that generates static electricity using the principle of the van der Graf generator to be as wide as possible in a limited space, thereby maximizing a cleaning efficiency.

In addition, the electrostatic cleaning device according to example embodiments is configured to supply power in a pulse cycle, so as to reduce power consumption of a battery thereby maximizing use time, and intermittently stop operation of a motor to reduce noise, thereby increasing the user's convenience and satisfaction.

In addition, the electrostatic cleaning device according to example embodiments is configured such that a scraper is detachably attached to the electrified body part and thus it is possible to easily remove foreign substances such as dust even from a cleaning target (bedding, carpets, etc.) requiring physical scraping, thereby broadening the user's cleaning options.

In addition, in the electrostatic cleaning device according to example embodiments, by providing a ground button on a button part, it is possible to easily drop foreign substances such as dust from the cleaner, thereby increasing the user's convenience and satisfaction.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The objects, specific advantages, and novel features of the present disclosure will become more apparent from the following detailed description and preferred embodiments taken in conjunction with the accompanying drawings. In the present specification, in adding reference numbers to the components of each drawing, it should be noted that only the same components are given the same number as possible even though they are indicated on different drawings. In addition, in describing the present invention, if it is determined that a detailed description of a related known technology may unnecessarily obscure the gist of the present invention, the detailed description thereof will be omitted.

Hereinafter, preferred embodiments of the present invention will be described in detail with reference to the accompanying drawings.

Figure 1:
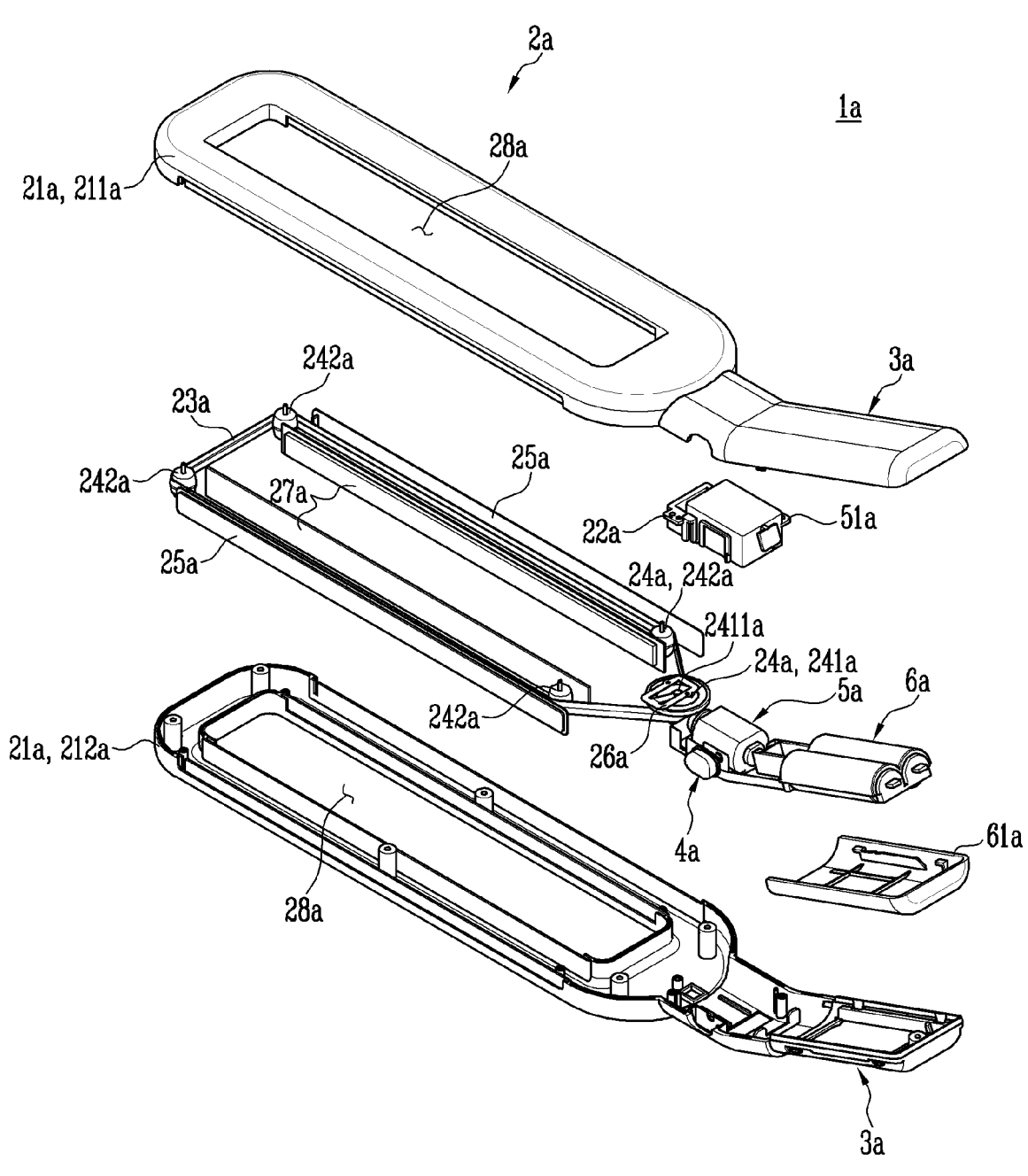
FIG. 1 is an exploded perspective view illustrating an electrostatic cleaning device in accordance with a first embodiment of the present disclosure.
Figure 2:
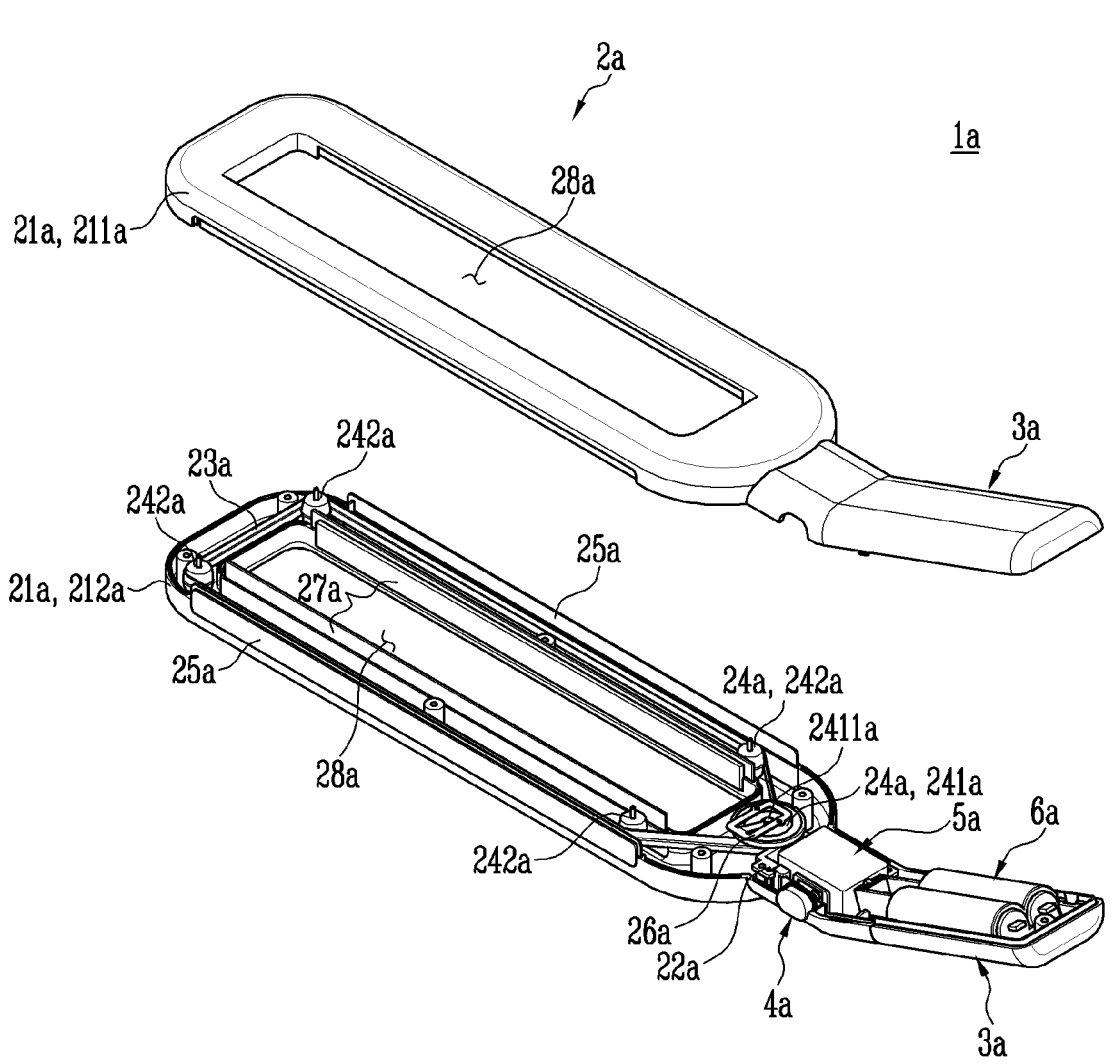
FIG. 2 is a partially assembled perspective view of the electrostatic cleaning device in accordance with the first embodiment of the present disclosure.
Figure 3:
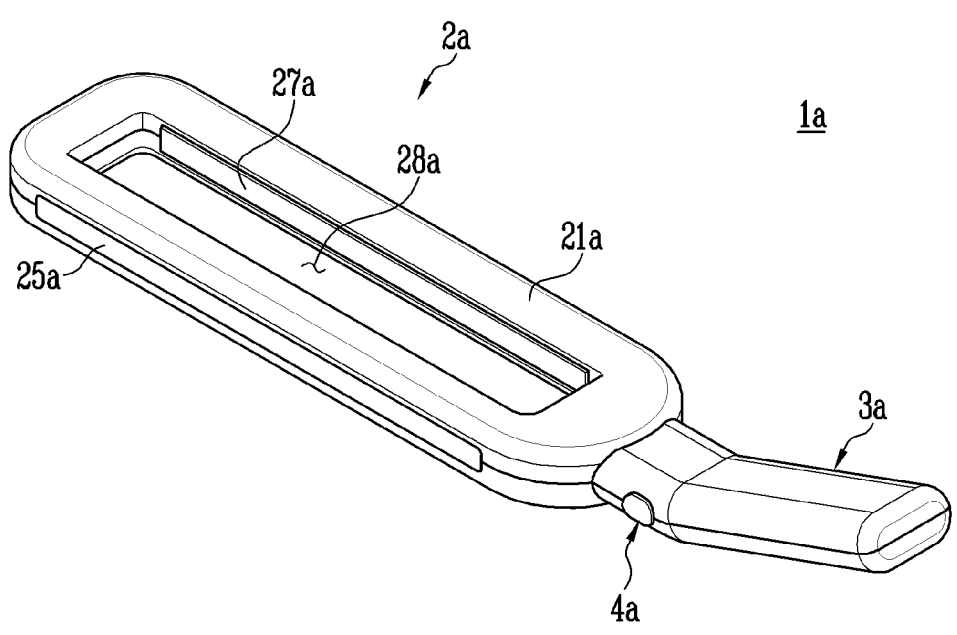
FIG. 3 is an assembled perspective view illustrating the electrostatic cleaning device in accordance with the first embodiment of the present disclosure.
Figure 4:
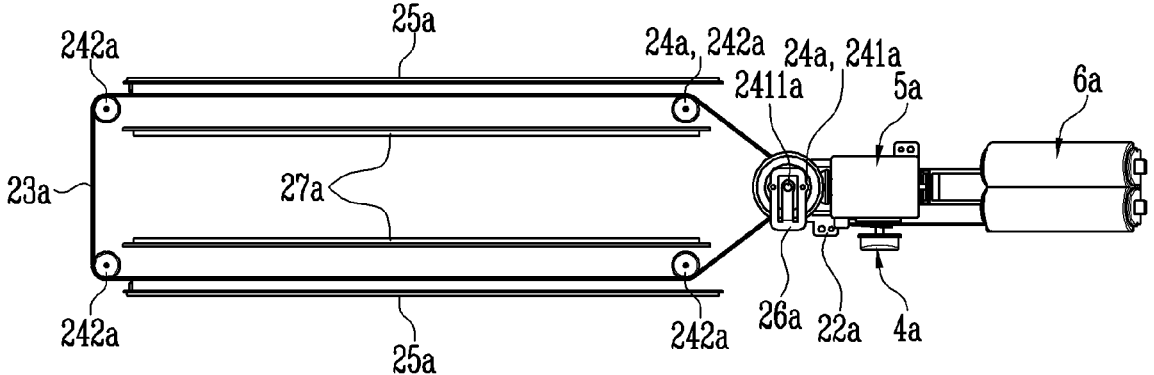
FIG. 4 is a diagram illustrating an internal configuration of the electrostatic cleaning device in accordance with the first embodiment of the present disclosure.
Figure 5:
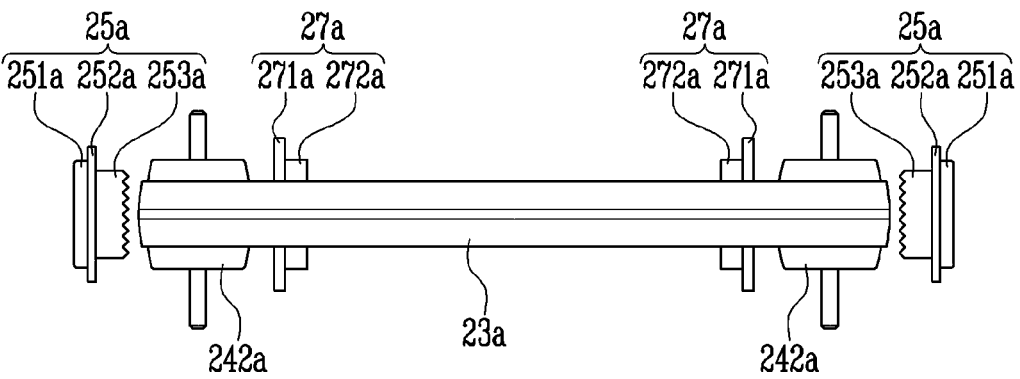
FIG. 5 is a front view illustrating a first conductor part and an attachment part of the electrostatic cleaning device in accordance with the first embodiment of the present disclosure.
Figure 6:
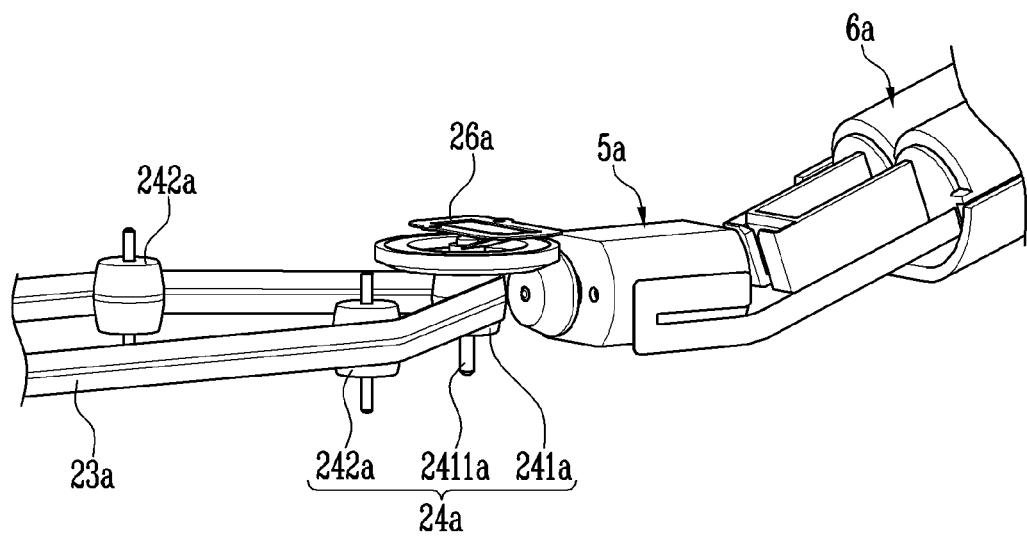
FIG. 6 is an enlarged perspective view illustrating a second conductor part of the electrostatic cleaning device in accordance with the first embodiment of the present disclosure.

FIG. 1 is an exploded perspective view illustrating an electrostatic cleaning device in accordance with a first embodiment of the present disclosure, FIG. 2 is a partially assembled perspective view illustrating the electrostatic cleaning device in accordance with the first embodiment of the present disclosure, FIG. 3 is an assembled perspective view illustrating the electrostatic cleaning device in accordance with the first embodiment of the present disclosure, FIG. 4 is a diagram illustrating an internal configuration of the electrostatic cleaning device in accordance with the first embodiment of the present disclosure, FIG. 5 is a front view illustrating a first conductor part and an attachment part of the electrostatic cleaning device in accordance with the first embodiment of the present disclosure, and FIG. 6 is an enlarged perspective view illustrating a second conductor part of the electrostatic cleaning device in accordance with the first embodiment of the present disclosure.

Figure 7:
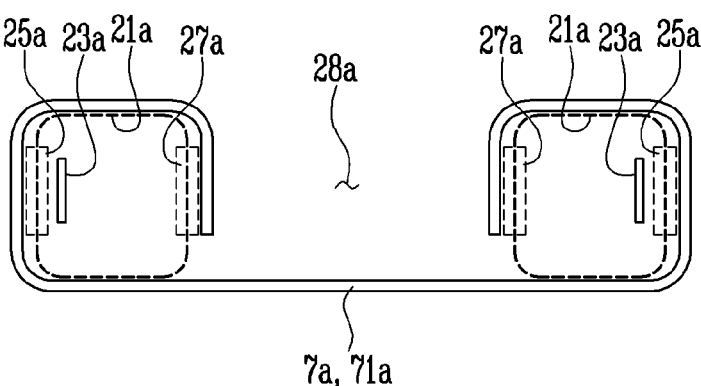
FIG. 7 is a diagram illustrating a cleaning tool of the electrostatic cleaning device in accordance with the first embodiment of the present disclosure.
Figure 8:
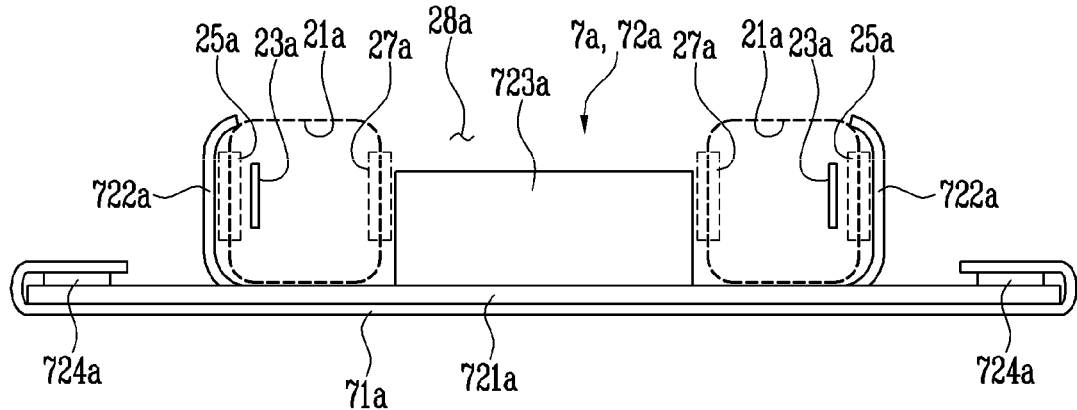
FIG. 8 is a diagram illustrating another cleaning tool of the electrostatic cleaning device in accordance with the first embodiment of the present disclosure.
Figure 9:
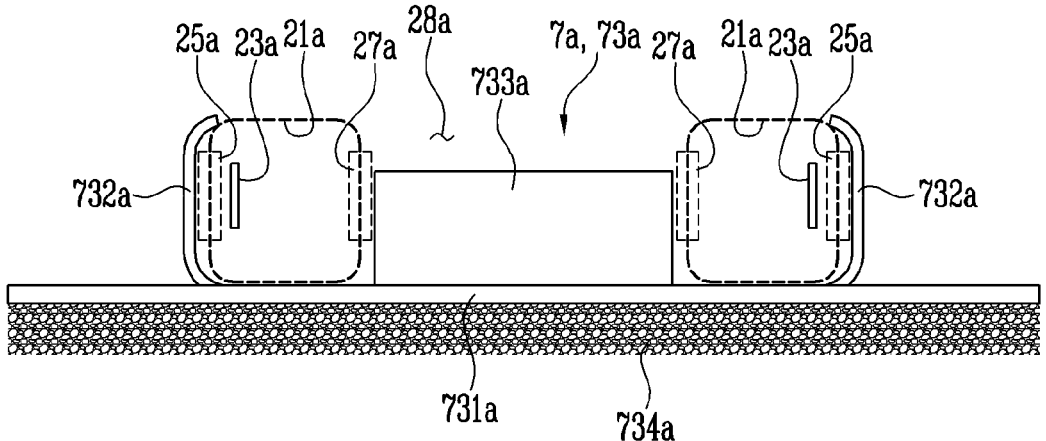
FIG. 9 is a diagram illustrating another cleaning tool of the electrostatic cleaning device in accordance with the first embodiment of the present disclosure.

FIG. 7 is a diagram illustrating a cleaning tool of the electrostatic cleaning device in accordance with the first embodiment of the present disclosure, FIG. 8 is a diagram illustrating another cleaning tool of the electrostatic cleaning device in accordance with the first embodiment of the present disclosure, and FIG. 9 is a diagram illustrating another cleaning tool of the electrostatic cleaning device in accordance with the first embodiment of the present disclosure.

Referring to FIG. 1 to FIG. 6, an electrostatic cleaning device 1a according to the first embodiment of the present disclosure may include a static electricity generator 2a, a handle part 3a, a power button part 4a, a motor 5a, and a battery 6a.

The static electricity generator 2a may generate static electricity to remove foreign substances such as dust and hair with static electricity, and may include a first electrified body part 21a, a second electrified body part 22a, a belt 23a, a roller part 24a, a first conductor part 25a, a second conductor part 26a, and an attachment part 27a.

In this embodiment, the static electricity generator 2a uses the principle of the Van de Graaff Generatora as a basic principle for generating static electricity, but is not limited thereto, and since the principle of the Van der Graaff generator is a known technology, a detailed description thereof will be omitted herein.

The first electrified body part 21a is a portion that receives a negative charge transferred through the belt 23a from the first conductor part 25a and generates static electricity, which may be formed in a donut-shaped case, and may be referred to as a main body connected to the handle part 3a in the electrostatic cleaning device 1a.

In the present embodiment, the electrified body part 21a having a rectangular donut-shape extending forward with respect to the handle part 3a is described as an example, but the present invention is not limited thereto.

As the first electrified body part 21a forms a donut-shape, a hole 28a may be formed in the central portion.

This hole 28a, as will be described later, may have a function of assembling and fixing a cleaning tool 7a.

The first electrified body part 21a may include an upper electrified body 211a and a lower electrified body 212a that may be assembled and disassembled. The upper and lower electrified bodies 211 and 212a may be configured such that a second electrified body part 22a, a belt 23a, a roller part 24a, a first conductor part 25a, a second conductor part 26a, and an attachment part 27a may be installed thereon.

The second electrified body part 22a may supply a negative charge to the belt 23a.

Specifically, the second electrified body part 22a may be installed in the handle part 3a to be spaced apart from the first electrified body part 21a by a predetermined interval, and may be configured to deliver the negative charge to the second conductor part 26a. Due to this, the second electrified body part 22a makes it possible to supply the negative charge to the belt 23a through the second conductor part 26a.

The second electrified body part 22a may be formed to have a polarity opposite to that of the first electrified body part 21a, wherein in this embodiment, the first electrified body part 21a may have a negative polarity, and the second electrified body part 22a may have a positive polarity.

The belt 23a may be formed between the first electrified body part 21a and the second electrified body part 22a.

The belt 23a may be rotatably installed in the inner space of the donut-shaped first electrified body part 21a.

The belt 23a may be installed on a drive roller 241a and a plurality of moving rollers 242a installed in the inner space of the donut-shaped first electrified body part 21a, and may be rotated by the rotational force of the drive roller 241a.

This belt 23a may transfer the negative charge, and deliver the negative charge to the first electrified body part 21a through the first conductor part 25a.

In the present embodiment, the belt 23a has the first electrified body part 21a in a donut shape, so that the length may be maximized in a limited space, thereby maximizing the static electricity generation force.

In other words, the static electricity generation force is proportional to the amount of charge q1, q2 by the formula of $F=K[q1\times q2]/D2$, and since the charge is distributed on the surface in proportion to the cross-sectional area of the material, the greater the length or width of the belt 23a, the greater the amount of charge. Therefore, in the case of the present invention, the length of the belt 23a may be made as long as possible under a limited space, thereby maximizing the static electricity generation force.

The roller part 24a is installed in the inner space of the donut-shaped first electrified body part 21a so that the belt 23a may rotate in the inner space of the first electrified body part 21a, and may include one drive roller 241a and a plurality of moving rollers 242a.

The drive roller 241a may be connected to the motor 5a and rotated by the driving force of the motor 5a, and may transmit the rotational force to the belt 23a.

The plurality of moving rollers 242a may be installed one at a time on a bent portion caused by the first electrified body part 21a forming a donut-shape to guide the rotating belt 23a. In this embodiment, since the first electrified body part 21a forms a rectangular donut-shape, moving rollers 242a may be installed at each square corner portion.

The first conductor part 25a may be installed on an outer surface of each of both sides of the first electrified body part 21a, and may deliver the negative charge transferred through the belt 23a to the first electrified body part 21a.

This first conductor part 25a may include an outer plate 251a exposed to the outer surface of each of the both sides of the first electrified body part 21a, a fixed plate 252a formed integrally with the outer plate 251a and fixed to the first electrified body part 21a, and a protrusion piece 253a connected to the fixed plate 252a and protruding so as to be adjacent to the belt 23a.

The negative charge of the belt 23a may be delivered to the first conductor part 25a through the protrusion piece 253a, in other words, the protrusion piece 253a serves as a bridge for delivering the negative charge.

The first conductor part 25a is connected to the power button part 4a, and when the power is turned OFF by the operation of the power button part 4a, static electricity may be removed.

The second conductor part 26a may deliver the negative charge of the second electrified body part 22a to the belt 23a.

The second conductor part 26a may be connected to the roller shaft 2411a of the roller part 24a, but is not limited thereto.

The second conductor part 26a is connected to the power button part 4a, and when the power is turned OFF by the operation of the power button part 4a, static electricity may be removed.

The attachment parts 27a may be installed on an inner surface of each of both sides of the first electrified body part 21a, and a cleaning tool 7a to be described later may be attached thereto.

The attachment part 27a may include a fixed plate 271a fixed to the first electrified body part 21a, and a velcro 272a that is adhered to the fixed plate 271a and exposed to an inner surface of each of the both sides of the first electrified body part 21a.

As shown in FIG. 7, when the cleaning tool 7a is the cleaning cloth 71a, both ends of the cleaning cloth 71a may be attached to the velcro 272a and thus the velcro 272a may fix the cleaning cloth 71a to the first electrified body part 21a.

In addition, as shown in FIGS. 8 and 9, when the cleaning tool 7a is the floor push stick head 72a or the brush head 73a, the velcro 272a serves to hold the second coupling parts 723 and 733a inserted into the hole 28a to prevent the floor push stick head 72a or the brush head 73a from being separated.

The handle part 3a may be connected to one side of the first electrified body part 21a forming the main body.

The handle part 3a may be formed in a shape and size that is easy for a user to grip by hand, and may be configured such that the second conductor part 26a, the power button part 4a, the motor 5a, and the battery 6a may be installed.

The power button part 4a may operate the static electricity generator 2a.

The power button part 4a may be provided between the motor 5a and the battery 6a, and may transmit power from the battery 6a to the motor 5a to drive the motor 5a.

The power button part 4a may be operated to rotate the motor 5a in a forward or reverse direction.

For example, the power button part 4a may be configured to turn on (ON) the power and rotate the motor 5a in the forward direction when pressed while the power is off (OFF), turn off the power when briefly pressed while the power is on, and rotate the motor 5a which is rotating in the forward direction in the reverse direction when pressed and held while the power is on, but is not limited thereto.

Configuring the power button part 4a to rotate the motor 5a in the forward or reverse direction as such, makes it possible to instantaneously switch the polarity (negative charge) generated when the motor 5a rotates in the forward direction to the opposite polarity (positive charge) when rotating in the reverse direction, and at this time, a neutral point may be created according to the reverse driving time, so that electrostatic force may be removed, and the cleaning tool 7a may be separated without static electricity.

The motor 5a may be installed inside the handle part 3a.

The motor 5a may receive power from the battery 6a by the operation of the power button part 4a to rotate the moving roller 242a, and may be protected by the motor case 51a.

The battery 6a may be installed inside the handle part 3a.

The battery 6a may be charged by applying a general smartphone charging terminal, and may be replaced by the battery cover 61a.

The electrostatic cleaning device 1a according to the first embodiment of the present disclosure may further include a cleaning tool 7a.

The cleaning tool 7a may be assembled to and disassembled from the first electrified body part 21a of the static electricity generator 2a, and may be configured to clean using the negative charge charged to the first electrified body part 21a.

The cleaning tool 7a may be a cleaning cloth 71a, as shown in FIG. 7.

The cleaning cloth 71a may be fixed by being attached at both ends to the velcro 272a of the attachment part 27a after wrapping the first electrified body part 21a, and may remove foreign substances such as dust or hairs in the air with the negative charge transferred from the first electrified body part 21a.

Also, the cleaning tool 7a may be a floor push stick head 72a, as shown in FIG. 8.

The floor push stick head 72a may be used to remove foreign substances from the floor, and may include a base 721a, a first coupling part 722a, a second coupling part 723a, and an auxiliary attachment part 724a.

The base 721a may have a flat plate shape so as to be in close contact with the floor, and a cleaning cloth 71a may be attached thereto.

The base 721a may have an upper surface in contact with a lower surface of the first electrified body part 21a to transfer the negative charge charged in the first electrified body part 21a to the cleaning cloth 71a.

A pair of the first coupling parts 722a may be provided on an upper portion of the base portion 721a. The pair of first coupling parts 722a may be provided to face each other at a distance corresponding to the width of the first electrified body part 21a.

The first coupling parts 722a may be in close contact with the outer surfaces of both sides of the first electrified body part 21a to fix the floor push stick head 72a.

In addition, the first coupling part 722a may be formed of a conductor, and accordingly, may be in contact and connected with the first conductor part 25a exposed to the outer surface of each of the both sides of the first electrified body part 21a to directly deliver the negative charge transferred through the belt 23a to the base 721a.

The second coupling part 723a may be provided as a protruding structure on the upper portion of the base 721a. The protruding structure of the second coupling part 723a may have a size corresponding to the size of the hole 28a formed in the central portion of the first electrified body part 21a, and may be in close contact with inner surfaces of both sides of the first electrified body part 21a in a state of being inserted into the hole 28a to fix the floor push stick head 72a together with the first coupling part 722a.

The auxiliary attachment part 724a may be provided on an edge of each of both upper sides of the base 721a.

The auxiliary attachment part 724a may be a velcro, and both ends of the cleaning cloth 71a may be attached to fix the cleaning cloth 71a to the base 721a.

Also, the cleaning tool 7a may be a brush head 73a, as shown in FIG. 9.

The brush head 73a may be used to remove foreign substances from furniture, and may include a base 731a, a first coupling part 732a, a second coupling part 733a, and a dust brush 734a.

The base 731a may have a flat plate shape so as to be in close contact with the floor, and the dust brush 734a may be attached to the lower surface thereof.

The base 731a may have an upper surface in contact with the lower surface of the first electrified body part 21a to transfer the negative charge charged in the first electrified body part 21a to the dust brush 734a.

A pair of the first coupling parts 732a may be provided on the upper portion of the base 731a. The pair of first coupling parts 732a may be provided to face each other at a distance corresponding to the width of the first electrified body part 21a.

The first coupling parts 732a may be in close contact with outer surfaces of both sides of the first electrified body part 21a to fix the brush head 73a.

In addition, the first coupling part 732a may be formed of a conductor, and accordingly, may be in contact and connected with the first conductor part 25a exposed to the outer surface of each of the both sides of the first electrified body part 21a to directly deliver the negative charge transferred through the belt 23a to the base 731a.

The second coupling part 733a may be provided as a protruding structure on the upper portion of the base portion 731a. The protruding structure of the second coupling part 733a may have a size corresponding to the size of the hole 28a formed in the central portion of the first electrified body part 21a, and may be in close contact with inner surfaces of both sides of the first electrified body part 21a in a state inserted into the hole 28a to fix the brush head 73a together with the first coupling part 732a.

The electrostatic cleaning device 1a according to the present invention configured as described above is configured so that the cleaning tools 7a for various purposes may be assembled on the donut-shaped static electricity generatort 2a, thereby broadening the user's cleaning options, and increasing the user's convenience and satisfaction.

In addition, in the electrostatic cleaning device 1a according to the present invention, since the static electricity generator 2a forms a donut-shape, a small amount of vortex is generated by the hole 28a formed in the center when dust in the air is removed, thereby improving the cleaning ability.

Figure 10:
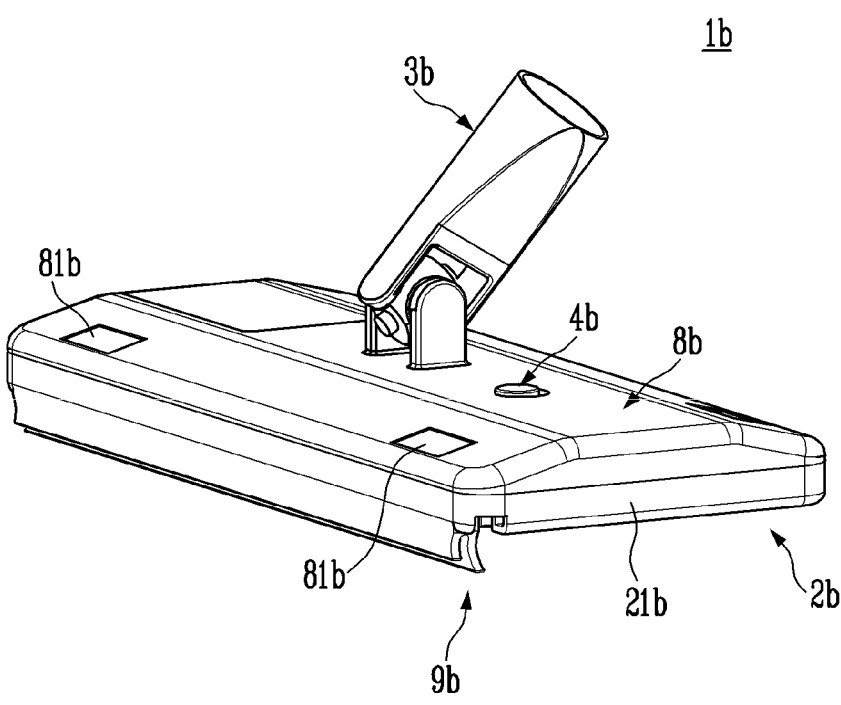
FIG. 10 is a perspective view illustrating an electrostatic cleaning device in accordance with a second embodiment of the present disclosure.
Figure 11:
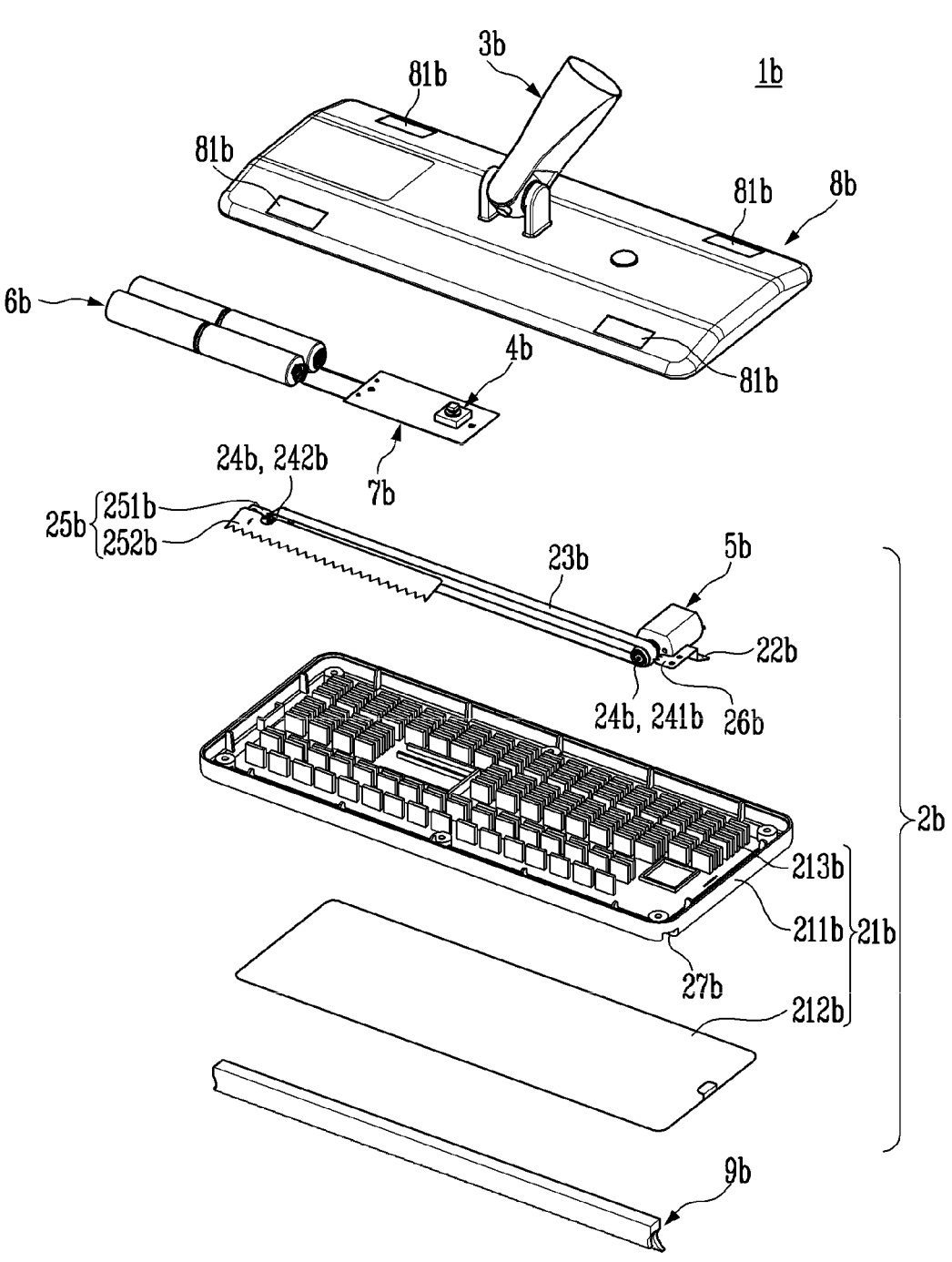
FIG. 11 is an exploded perspective view illustrating the electrostatic cleaning device in accordance with the second embodiment of the present disclosure.
Figure 12:
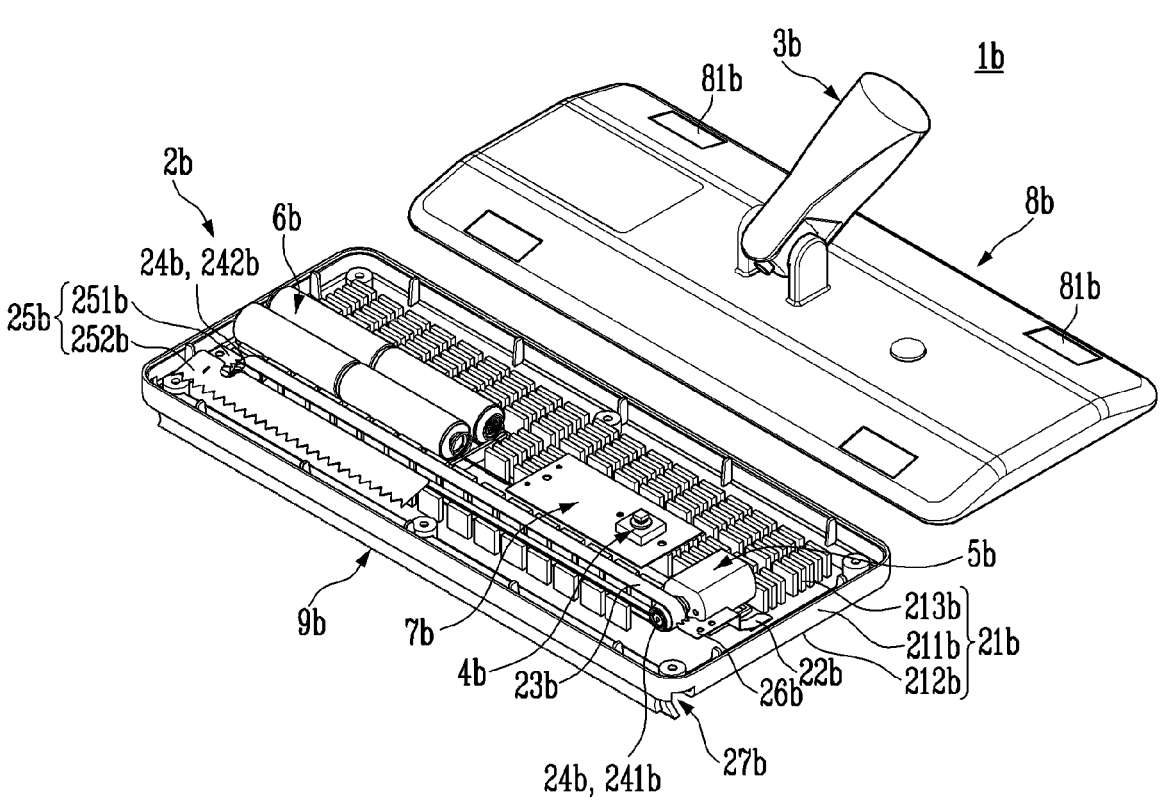
FIG. 12 and FIG. 13 are partially assembled perspective views illustrating the electrostatic cleaning device in accordance with the second embodiment of the present disclosure.
Figure 13:
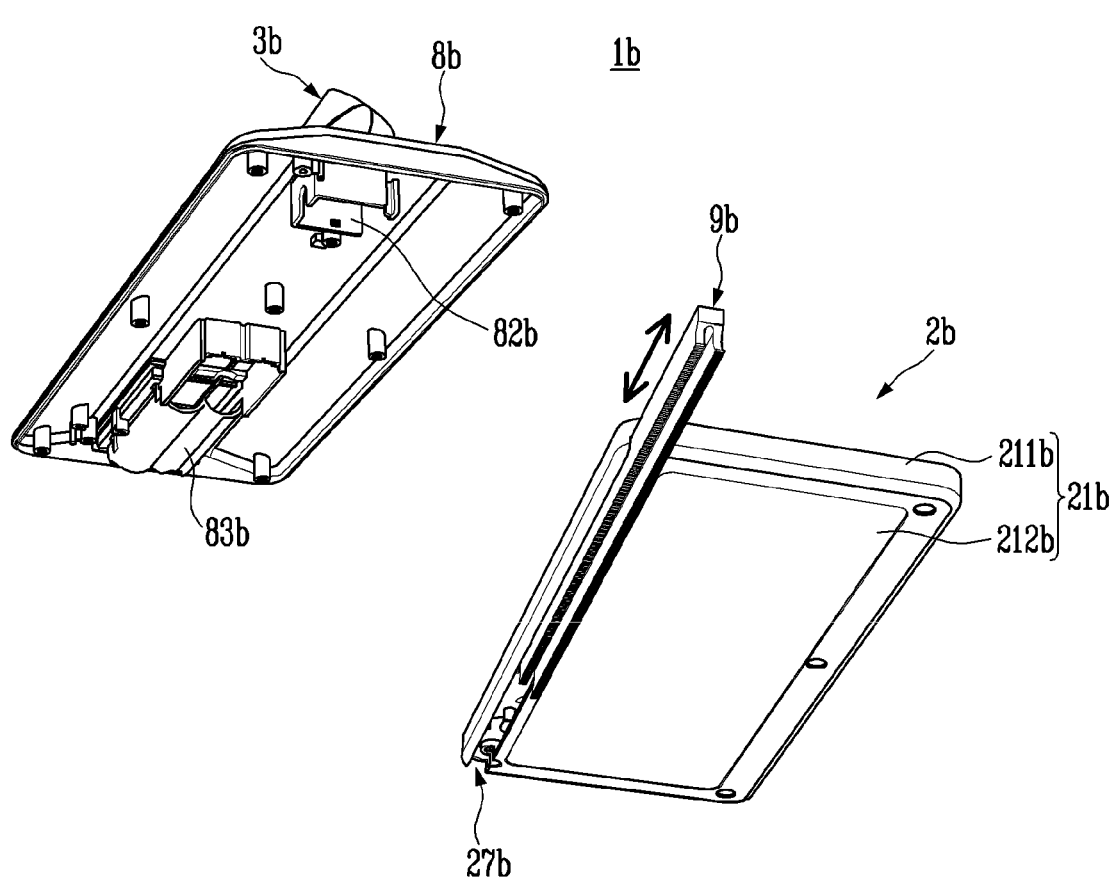
Figure 14:
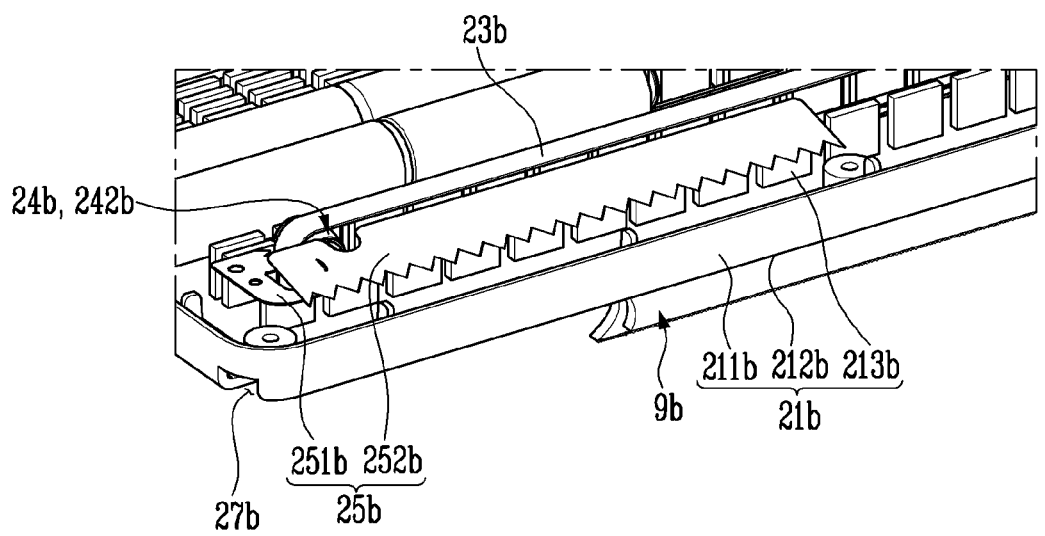
FIG. 14 is an enlarged view illustrating a first conductor part of the electrostatic cleaning device in accordance with the second embodiment of the present disclosure.

FIG. 10 is a perspective view illustrating an electrostatic cleaning device in accordance with a second embodiment of the present disclosure, FIG. 11 is an exploded perspective view illustrating the electrostatic cleaning device in accordance with the second embodiment of the present disclosure, FIG. 12 and FIG. 13 are partially assembled perspective views illustrating the electrostatic cleaning device in accordance with the second embodiment of the present disclosure, and FIG. 14 is an enlarged view illustrating a first conductor part of the electrostatic cleaning device in accordance with the second embodiment of the present disclosure.

Figure 15A:
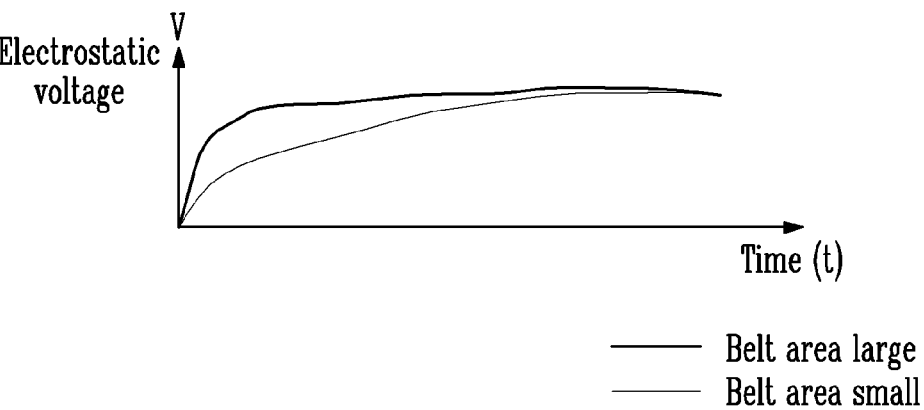
FIG. 15A is a graph illustrating a change in electrostatic voltage according to an area size of an electrostatic induction belt.
Figure 15B:
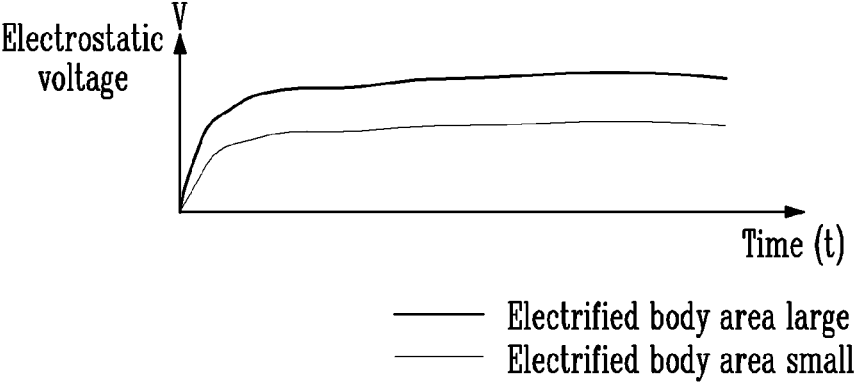
FIG. 15B is a graph illustrating a change in electrostatic voltage according to an area size of an electrified body part.
Figure 16A:
FIG. 16A is a graph illustrating a change in electrostatic voltage when power is supplied in a fixed period.
Figure 16B:
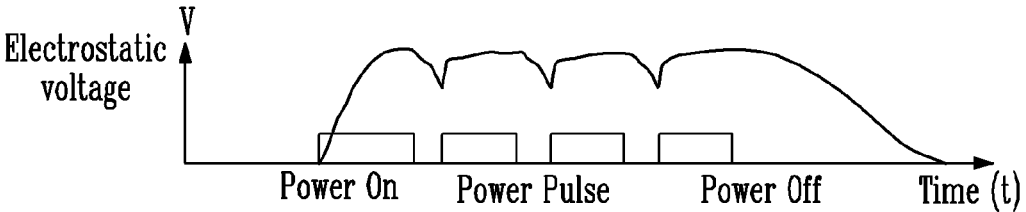
FIG. 16B is a graph illustrating a change in electrostatic voltage when power is supplied in a pulse cycle.

In addition, FIG. 15A is a graph illustrating a change in electrostatic voltage according to an area size of an electrostatic induction belt, FIG. 15B illustrates a graph showing a change in electrostatic voltage according to an area size of an electrified body part, FIG. 16A is a graph illustrating a change in electrostatic voltage when power is supplied in a fixed period, and FIG. 16B is a graph illustrating a change in electrostatic voltage when power is supplied in a pulse cycle.

Referring to FIGS. 10 to 14, an electrostatic cleaning device 1b according to the second embodiment of the present disclosure may include a static electricity generator 2b, a handle 3b, a button part 4b, a motor 5b, a battery 6b, a circuit board 7b, a cover part 8b, and a scraper 9b.

The static electricity generator 2b is connected to the cover part 8b provided with the handle 3b, and may be configured to generate static electricity and deliver it to a cleaning tool (not shown) such as a cleaning cloth to remove foreign substances such as dust and hair with static electricity The static electricity generator 2b may include a first electrified body part 21b, a second electrified body part 22b, an electrostatic induction belt 23b, a roller part 24b, a first conductor part 25b, and a second conductor part 26b, and a coupling part 27b.

In this embodiment, the static electricity generator 2b uses the principle of the Van de Graaff Generatora as a basic principle for generating static electricity, but is not limited thereto, and since the principle of the Van der Graaff generator is a known technology, a detailed description thereof will be omitted herein.

The first electrified body part 21b is a portion in which static electricity is generated by receiving the negative charge transferred through the electrostatic induction belt 23b from the first conductor part 25b, and may have a box shape with an open upper portion, and may be referred to as a main body in which the open upper portion is sealed by the cover part 8b.

The first electrified body part 21b may be formed of an electrified body material that collects the negative charge and can remove foreign substances such as dust, and may include an edge electrified body 211b, a bottom electrified body 212b, and an auxiliary electrified body 213b.

The first electrified body part 21b may be formed using conductive plastic (e.g., LUCON CP6062) as an electrified body material. If conductive plastic is used, it does not need to be replaced even if worn out due to friction caused by repeated use, improving durability issue and reducing costs compared to using conventional plating materials.

In the present embodiment, although it is described that the first electrified body part 21b is formed of conductive plastic, it is of course not limited thereto and may be formed of an electrified body material such as plating or a metal plate.

The edge electrified body 211b may collect a negative charge while forming the edge of the main body, and may be formed in a size corresponding to the edge of the cover part 8b. The upper open portion of the edge electrified body 211b may be coupled to the cover part 8b. The edge electrified body 211b may remove foreign substances floating on the floor during cleaning.

The bottom electrified body 212b may collect a negative charge while forming the bottom of the main body, and may be installed in the lower open portion of the edge electrified body 211b. The bottom electrified body 212b may remove foreign substances present on the floor during cleaning.

On the inner surface of the bottom electrified body 212b, an installation space in which other components, such as a second electrified body part 22b, an electrostatic induction belt 23b, a roller part 24b, a first conductor part 25b, a second conductor part 26b, a motor 5b, a battery 6b, and a circuit board 7b are installed may be provided. These other components are described below by limiting installation positions such as one side and/or the other side of the inner surface of the bottom electrified body 212b, but are not limited thereto, and may be arranged differently in terms of space utilization.

The bottom electrified body 212b may have a double structure in which an inner surface is formed of an un-electrified body material and an outer surface is formed of an electrified body material. This is because other components installed on the inner surface of the bottom electrified body 212*b* must be prevented from being affected by static electricity. However, in addition to the other components on the inner surface of the bottom electrified body 212*b*, the auxiliary electrified body 213*b* is also installed, and the portion where the auxiliary electrified body 213*b* is installed should be configured such that the electrified body material forming the outer surface is exposed.

The auxiliary electrified body 213*b* is installed in the inner space of the first electrified body part 21*b* to increase the total surface area of the first electrified body part 21*b* to increase the maximum saturation point of the electrostatic force. The auxiliary electrified body 213*b* may be composed of a plurality of rib assemblies on the inner surface of the bottom electrified body 212*b* so as to increase the total surface area of the first electrified body 21*b* in addition to the surface area of the edge electrified body 211*b* and the surface area of the bottom electrified body 212*b*, wherein the auxiliary electrified body 213*b* may be installed so as to be connected to the electrified body material forming the outer surface of the bottom electrified body 212*b*.

The auxiliary electrified body 213*b* may be installed in any space except for the free space of the bottom electrified body 212*b*, that is, the installation space in which the above-described other components are installed.

The auxiliary electrified body 213*b* may be assembled or integrally formed so as to be connected to the electrified body material forming the outer surface of the bottom electrified body 212*b*.

This auxiliary electrified body 213*b*, unlike the edge electrified body 211*b* and the bottom electrified body 212*b*, does not directly participate in the removal of foreign substances, but can increase the total surface area of the first electrified body part 21*b*, which makes it possible to increase the electrostatic force of the first electrified body part 21*b* as a result.

In general, the electrostatic force is affected by the area of the electrostatic induction belt 23*b* and the area of the first electrified body 21*b*, which will be described later, and as shown in FIG. 15A, it can be seen that as the area of the electrostatic induction belt 23*b* increases, the time for the electrostatic force (electrostatic voltage) to reach the maximum saturation point is shortened and the time to maintain the maximum saturation point is increased, and as shown in FIG. 15B, it can be seen that the maximum saturation point of the electrostatic force increases as the area of the first electrified body part 21*b* increases.

As described above, in this embodiment, by installing the auxiliary electrified body 213*b*, the surface area may be increased in a limited space, and the electrostatic force of the first electrified body part 21*b* may be maximized while maintaining the shape of the compact electrostatic cleaning device 1*b* as it is.

The second electrified body part 22*b* may supply a negative charge to the electrostatic induction belt 23*b* through the second conductor part 26*b*, and may be installed on one side of the inner surface of the bottom electrified body 212*b*.

The second electrified body part 22*b* may be formed to have a polarity opposite to that of the first electrified body part 21*b*, and in this embodiment, the first electrified body part 21*b* may have a negative polarity, and the second electrified body part 22*b* may have a positive polarity.

The electrostatic induction belt 23*b* may be rotatably installed in the inner space of the first electrified body part

21*b*. The electrostatic induction belt 23*b* may be installed in a longitudinal direction on the inner surface of the bottom electrified body 212*b* so as to secure the maximum area even though the space is limited.

The electrostatic induction belt 23*b* may be installed between the first conductor part 25*b* installed on the other side of the inner surface of the bottom electrified body 212*b* and the second conductor part 26*b* installed on one side of the inner surface of the bottom electrified body 212*b*, and may deliver the negative charge supplied through the second conductor part 26*b* to the first conductor part 25*b*. The electrostatic induction belt 23*b* may be connected to a drive roller 241*b* installed on one side of the inner surface of the bottom electrified body 212*b* and a moving roller 242*b* installed on the other side of the inner surface of the bottom electrified body 212*b* to be rotated by the rotational force of the drive roller 241*b*.

Such an electrostatic induction belt 23*b* may transfer the negative charge, and may deliver the negative charge to the first electrified body part 21*b* through the first conductor part 25*b*.

The roller part 24*b* may be installed on the inner surface of the bottom electrified body 212*b*, and may include a drive roller 241*b* and a moving roller 242*b*.

The drive roller 241*b* may be installed on one side of the inner surface of the bottom electrified body 212*b*. The drive roller 241*b* may be connected to the motor 5*b* and rotated by the driving force of the motor 5*b*, and may transmit the rotational force to the electrostatic induction belt 23*b*.

The moving roller 242*b* may be installed on the other side of the inner surface of the bottom electrified body 212*b*, and one or more may be installed.

In the above, the drive roller 241*b* and the moving roller 242*b* may be formed of a material having a negative charge, such as Teflon (Polytetrafluoroethylene, PTFE).

The first conductor part 25*b* may be installed on the other side of the inner surface of the bottom electrified body 212*b*, and may deliver the negative charge transferred through the electrostatic induction belt 23*b* to the first electrified body part 21*b*.

The first conductor part 25*b* may include a collecting plate 251*b* that collects the negative charge transferred from the electrostatic induction belt 23*b*, and a delivering plate 252*b* that delivers the collected negative charge to the first electrified body part 21*b*.

The collecting plate 251*b* is installed so that one side is adjacent to the electrostatic induction belt 23*b*, and may form a peak shape of a lightning rod structure or a sawtooth shape to easily collect the negative charge from the electrostatic induction belt 23*b*. The other side of the collecting plate 251*b* may be connected to the delivering plate 252*b*.

The delivering plate 252*b* may be installed such that one side is connected to the other side of the collecting plate 251*b* and the other side is adjacent to the edge electrified body 211*b* of the first electrified body part 21*b*.

The other side of the delivering plate 252*b* extends long in the longitudinal direction of the edge electrified body 211*b* to easily deliver the negative charge to the first electrified body part 21*b*, and may form a peak shape of a lightning rod structure or sawtooth shape.

The first conductor part 25*b* may be connected to the button part 4*b* and remove static electricity when the power is turned off (OFF) by manipulating the button part 4*b*.

The second conductor part 26*b* may deliver the negative charge of the second electrified body part 22*b* to the electrostatic induction belt 23*b*.

The second conductor part 26b may be installed so that one side is adjacent to the electrostatic induction belt 23b, and may form a peak shape of a lightning rod structure or a sawtooth shape to easily deliver the negative charge to the electrostatic induction belt 23b. The other side of the second conductor part 26b may be connected to the second electrified body part 22b.

The second conductor part 26b may be connected to the button part 4b and remove static electricity when the power is turned off (OFF) by manipulating the button part 4b.

The coupling part 27b may be provided so that the scraper 9b may be detachably attached to the first electrified body part 21b. The coupling part 27b may be provided in the form of a groove on the front portion of the first electrified body part 21b in a longitudinal direction crossing the cleaning direction.

The scraper 9b is detachable from the coupling part 27b and may be configured to easily remove foreign substances such as dust from a cleaning target (bedding, carpets, etc.) requiring physical scraping.

Experimental results showed that the electrostatic force was selectively expressed according to types of dust and the properties of the floor (cloth, bedding, PVC, wood, flooring, PE, etc.). For example, while foreign substances (dust, hair, other animal hair, etc.) that were well charged with a positive charge were removed very effectively without the scraper 9b attached when the floor was PVC, PP, or corrugated flooring, which was easily negatively charged, they could not be effectively removed without the scraper 9b attached from cloths, bedding, carpets, etc., where the floor had a positive charge, and in the state in which the scraper 9b was attached, the scraper 9b physically separated foreign substances in close contact with cloth, bedding, carpet, and the like, so that they could be effectively removed.

The electrostatic cleaning device 1b of the present embodiment is configured to attach and detach the scraper 9b and thus may be used for multiple purposes such as cleaning a general floor basically by attaching a cleaning tool such as a cleaning cloth and cleaning the cleaning target requiring physical scraping by attaching the scraper 9b without the cleaning cloth.

The handle 3b may be connected to the cover part 8b, and may be formed in a shape and size that is easy for a user to grip by hand.

The button part 4b may include a power button, and may operate the static electricity generator 2b.

The button part 4b may be provided on the circuit board 7b, and may drive the motor 5b by transmitting power from the battery 6b to the motor 5b.

In addition, when the power button is pressed while the power is off (OFF), the button part 4b allows power to be supplied in a pulse cycle while the power is turned on (ON).

Generally, as shown in FIG. 16A, the conventional electrostatic cleaner is configured so that when the power button is pressed to turn the power from the off state to the on state, power is supplied at a fixed period to continuously operate the motor, and stop the operation of the motor when the power button is pressed once more to turn to the off state, and as the motor continues to operate until the cleaning is complete, the power consumption stored in the battery is inevitably increased and noise is inevitably generated continuously.

On the other hand, as shown in FIG. 16B, the electrostatic cleaning device 1b of this embodiment is configured so that when the power button of the button part 4b is pressed while the power is off, the electrostatic cleaning device repeats maintaining an on state for an initial first time to operate the motor, then maintaining an off state for a second time to stop the operation of the motor 5b, and maintaining the on state for a third time to operate the motor until cleaning is finished (the user presses the power button once more to turn the power off completely).

In the above, the first time may be at least the time until the electrostatic power (electrostatic voltage) reaches the maximum saturation point, and the second time may be the time until the electrostatic power falls to a preset value by natural discharge after the power is turned off using the principle that natural discharge takes a long time, and the third time may be a time until the electrostatic power which has fallen to a preset value reaches a maximum saturation point. Since the first time has to reach the maximum saturation point in a state in which the electrostatic power is zero, the first time may be relatively longer than the third time to reach the maximum saturation point from the electrostatic power that has dropped to a preset value. In the case of the second time, the length may vary according to the natural discharge time and a preset value.

As described above, when power is supplied in a pulse cycle by the button part 4b, the electrostatic power is maintained similar to that continuously supplied, so that the motor 5b is intermittently stopped without affecting the cleaning using static electricity to reduce power consumption stored in the battery 6b as well as reduce noise.

Also, the button part 4b may include a ground button. The ground button of the button part 4b is used to remove dust from the electrostatic cleaning device 1b, and when the ground button is pressed, the polarity (negative charge) generated while the electrostatic induction belt 23b is rotated by the motor 5b is momentarily dissipated, the electrostatic power is lowered, so that foreign substances such as dust may be easily removed from the electrostatic cleaning device 1b.

As such, in this embodiment, by providing the ground button on the button part 4b, the electrostatic power generated during cleaning takes a long time to naturally discharge even after the power button of the button part 4b is turned off, so as to solve the problem that it is difficult to easily remove foreign substances from the electrostatic cleaning device 1b.

In addition, the button part 4b may be operated to rotate the motor 5b in the forward or reverse direction with the power button.

For example, the button part 4b may be configured to turn on (ON) the power and rotate the motor 5b in the forward direction when pressed while the power is off (OFF), turn off the power when briefly pressed while the power is on, and rotate the motor 5b which is rotating in the forward direction in the reverse direction when pressed and held while the power is on, but is not limited thereto.

Configuring the button part 4b to rotate the motor 5b in the forward or reverse direction as such, makes it possible to instantaneously switch the polarity (negative charge) generated when the motor 5b rotates in the forward direction to the opposite polarity (positive charge) when rotating in the reverse direction, and at this time, a neutral point may be created according to the reverse driving time, so that electrostatic force may be removed, and the cleaning tool 7b may be separated without static electricity.

The motor 5b may be installed on one side of the inner surface of the bottom electrified body 212b.

The motor 5b may receive power from the battery 6b by the operation of the button part 4b to rotate the moving roller 242b, and may be protected with a motor case 82b provided inside the cover part 8b.

The battery 6b may be installed on the other side of the inner surface of the bottom electrified body 212b.

The battery 6b may be charged by applying a general smartphone charging terminal, and may be protected by a battery case 82b provided inside the cover part 8b.

The circuit board 7b may be installed between the motor 5b and the battery 6b on the inner surface of the bottom electrified body 212b, and may be designed to implement various functions in the electrostatic cleaning device 1b.

The cover part 8b may seal the open upper portion of the first electrified body part 21b.

On the outer surface of the cover part 8b, a handle 3b may be connected thereto, and a plurality of attachment parts 81b to which various cleaning tools (not shown) such as a cleaning cloth may be attached may be provided.

A motor case 82b accommodating the motor 5b and a battery case 83b accommodating the battery 6b may be provided on the inner surface of the cover part 8b.

The electrostatic cleaning device 1b according to the present invention configured as described above is capable of increasing the electrostatic force in proportion to the increased surface area of the electrified body part 21b even if the length of the electrostatic induction belt 23b for delivering the electrostatic charge (negative charge) to the electrified body part 21b is relatively short, by configuring the surface area of the electrified body part 21b that collects electrostatic charge (negative charge) in the static electricity generator 2b that generates static electricity using the principle of the van der Graf generator to be as wide as possible in a limited space, thereby maximizing the cleaning efficiency.

In addition, in the electrostatic cleaning device 1b according to the present invention, by configuring to supply power in a pulse cycle, the power consumption of the battery 6b may be reduced to maximize the use time, and the operation of the motor 5b may be intermittently stopped to reduce noise, thereby increasing user convenience and satisfaction.

In addition, in the electrostatic cleaning device 1b according to the present invention, by configuring the scraper 9b to be detachably attached to the electrified body part 21b, foreign substances such as dust may be easily removed from the cleaning target that requires physical scraping (bedding, carpet, etc.), thereby broadening the user's cleaning options.

In addition, in the electrostatic cleaning device 1b according to the present invention, by providing a ground button on the button part 4b, foreign substances such as dust may be easily removed from the cleaner, thereby increasing user convenience and satisfaction.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

EXPLANATION OF SYMBOLS

1a: Electrostatic cleaning device 2a: Static electricity generator
21a: First electrified body part 211a: Upper electrified body
212a: Lower electrified body 22a: Second electrified body part
23a: Belt 24a: Roller part
241a: Drive roller 2411a: Roller shaft
242a: Moving roller 25a: First conductor part
251a: Outer plate 252a: Fixed plate
253a: Protrusion piece 26a: Second conductor part
27a: Attachment part 271a: Fixed plate
272a: Velcro 28a: Hole
3a: Handle part 4a: Power button part
5a: Motor 51a: Motor case
6a: Battery 61a: Battery cover
7a: Cleaning tool 71a: Cleaning cloth
72a: Floor push stick head 721a: Base
722a: First coupling part 723a: Second coupling part
724a: Auxiliary attachment part 73a: Brush head
731a: Base 732a: First coupling part
733a: Second coupling part 734a: Dust brush
1b: Electrostatic cleaning device 2b: Static electricity generator
21b: First electrified body part 211b: Edge electrified body
212b: Bottom electrified body 213b: Auxiliary electrified body
22b: Second electrified body part 23b: Electrostatic induction belt
24b: Roller part 241b: Drive roller
242b: Moving roller 25b: First conductor part
251b: Collecting plate 252b: Delivering plate
26b: Second conductor part 27b: Coupling part
3b: Handle 4b: Button part
5b: Motor 6b: Battery
7b: Circuit board 8b: Cover part
81b: Attachment part 82b: Motor case
83b: Battery case 9b: Scraper

What is claimed is:

1. An electrostatic cleaning device comprising:
a static electricity generator connected to a cover part provided with a handle and configured to generate static electricity and deliver the static electricity to a cleaning tool; and
a button part configured to operate the static electricity generator,
wherein the static electricity generator comprises:

a first electrified body part forming a main body sealed by the cover part and configured to deliver a negative charge to the cleaning tool;

an electrostatic induction belt rotatably disposed in an inner space of the first electrified body part and configured to transfer the negative charge, and extending in a longitudinal direction;

a second electrified body part configured to supply the negative charge to the electrostatic induction belt; and a bottom electrified body forming a bottom of the main body and including an electrified body material such that the bottom electrified body is configured to collect the negative charge to remove foreign substances, wherein the first electrified body part comprises an auxiliary electrified body comprising a plurality of rib assemblies protruding in a thickness direction of the bottom electrified body in the inner space, the auxiliary electrified body being connected to the bottom electrified body, and the thickness direction and the longitudinal direction being different each other, and wherein the plurality of rib assemblies comprises the electrified body material such that the plurality of rib assemblies increases a maximum saturation point of electrostatic force.

2. The electrostatic cleaning device of claim 1, wherein the first electrified body part comprises an edge electrified body forming an edge of the main body and configured to collect the negative charge to remove foreign substances floating from a floor.

3. The electrostatic cleaning device of claim 2, wherein the auxiliary electrified body is disposed on an inner surface part of the bottom electrified body, and is installed so as to be connected to the electrified body material of the bottom electrified body.

4. The electrostatic cleaning device of claim 2, wherein the auxiliary electrified body is assembled or integrally formed so as to be connected to the electrified body material of the bottom electrified body.

5. The electrostatic cleaning device of claim 2, wherein the static electricity generator further comprises:

a first conductor part configured to deliver the negative charge transferred through the electrostatic induction belt to the first electrified body part; and a second conductor part configured to deliver the negative charge of the second electrified body part to the electrostatic induction belt.

6. The electrostatic cleaning device of claim 5, wherein the first conductor part comprises:

a collecting plate having a first side installed adjacent to the electrostatic induction belt and forming a peak shape of a lightning rod structure or a sawtooth shape to collect the negative charge from the electrostatic induction belt; and a delivering plate having a first side connected to a second side of the collecting plate and a second side of the delivering plate being installed to be adjacent to the edge electrified body of the first electrified body part, extending long in a longitudinal direction of the edge electrified body to deliver the negative charge to the first electrified body part, and forming a peak shape of a lightning rod structure or a sawtooth shape.

7. The electrostatic cleaning device of claim 1, wherein the static electricity generator further comprises a coupling part provided in a form of a groove on a front portion of the first electrified body part in a longitudinal direction intersecting a cleaning direction, and wherein the coupling part is provided to detachably attach a scraper configured to remove foreign substances from a cleaning target requiring physical scraping.

8. The electrostatic cleaning device of claim 1, wherein when the button part is pressed while power is off, the power is turned on and electric power is supplied in a pulse cycle.

9. The electrostatic cleaning device of claim 8, wherein, when the button part is pressed while the power is off, the electrostatic cleaning device repeats maintaining an on state for an initial first time to operate a motor configured to rotate the electrostatic induction belt, then maintaining an off state for a second time to stop the operation of the motor, and maintaining the on state for a third time to operate the motor.

10. The electrostatic cleaning device of claim 1, wherein the button part is configured to remove foreign substances from the electrostatic cleaning device, and wherein, when the button part is pressed, the negative charge generated while the electrostatic induction belt is rotated by a motor is momentarily dissipated and the electrostatic force is lowered so as to remove foreign substances.

11. The electrostatic cleaning device of claim 1, wherein the first electrified body part is formed using conductive plastic as the electrified body material.

12. The electrostatic cleaning device of claim 1, wherein the first electrified body part forms a planar lower surface.

13. The electrostatic cleaning device of claim 1, wherein the electrostatic induction belt is disposed between the first electrified body part and the handle.

* * * * *